US006565348B1

(12) United States Patent
Snijder et al.

(10) Patent No.: US 6,565,348 B1
(45) Date of Patent: May 20, 2003

(54) EXTRUDER FOR CONTINUOUSLY MANUFACTURING COMPOSITES OF POLYMER AND CELLULOSIC FIBRES

(75) Inventors: Martinus Hendricus Bernard Snijder, Wageningen (NL); Mathea Johanna Joseph Maria Van Kemenade, Haaften (NL); Harriette Louise Bos, Arnhem (NL)

(73) Assignee: Instituut Voor Agrotechnologisch Onderzoek (ATO-DLO), Wageningen (NL)

( * ) Notice: Subject to any disclaimer, the term of this patent is extended or adjusted under 35 U.S.C. 154(b) by 0 days.

(21) Appl. No.: 09/674,828

(22) PCT Filed: May 7, 1999

(86) PCT No.: PCT/NL99/00282

§ 371 (c)(1),
(2), (4) Date: Feb. 27, 2001

(87) PCT Pub. No.: WO99/56936

PCT Pub. Date: Nov. 11, 1999

(30) Foreign Application Priority Data

May 7, 1998 (EP) ............................................ 98201497

(51) Int. Cl.[7] ........................... B29B 7/46; B29C 47/10; B29C 47/40

(52) U.S. Cl. ............................ 425/209; 366/83; 366/88

(58) Field of Search ......................... 366/75, 76.1, 76.6, 366/76.9, 79, 83–85, 88, 89, 321; 425/204, 208, 209

(56) References Cited

U.S. PATENT DOCUMENTS 3,382,536 A * 5/1968 Fritsch et al.
3,409,711 A * 11/1968 Pashak et al.
3,453,356 A * 7/1969 Kent, Jr. et al.
4,329,313 A * 5/1982 Miller et al.
4,663,103 A * 5/1987 McCullough et al.
4,848,915 A * 7/1989 Fintel
5,110,275 A * 5/1992 Schuering
5,145,251 A * 9/1992 Shirato et al.
5,358,680 A * 10/1994 Boissonnat et al.
5,358,693 A * 10/1994 Brinkmann et al.
5,653,534 A * 8/1997 Matsumoto et al.
5,851,065 A * 12/1998 Ikeda et al.
6,220,745 B1 * 4/2001 Kobayashi et al.
6,364,518 B1 * 4/2002 Gleich et al.

FOREIGN PATENT DOCUMENTS

EP 0 118 847 9/1984
EP 0 426 619 5/1991
GB 1 151 964 5/1969
GB 2 140 314 11/1984
JP 58-110233 9/1983
JP 2-286208 * 11/1990
WO WO 97/30838 8/1997

* cited by examiner

*Primary Examiner*—Charles E. Cooley

(57) ABSTRACT

A polymer is fed upstream into an extruder. The polymer is melted and mixed in a zone (A). Cellulosic fibres are fed into the extruder in a zone (B). A mixture of the polymer and the fibres obtained in zone (B) is transported through a degassing zone (C) and then through a pressure building zone (D). The mixture is released from zone (D) into a die. Each of zones (A), (C) and (D) includes at least one positive transportation screw element. The zone (B) includes at least one positive transportation screw element, at least one kneading section and at least one negative transportation screw element such that the cellulosic fibres are fibrillated to obtain cellulosic fibres with an aspect ratio as high as possible while simultaneously mixing the cellulosic fibres with the melted polymer.

19 Claims, 1 Drawing Sheet

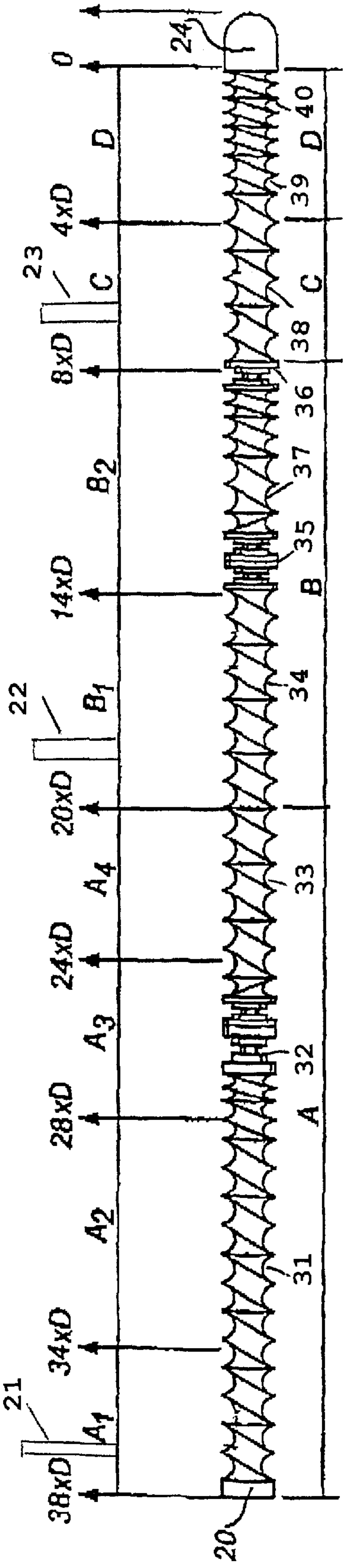
0
D
4xD
C
8xD
B2
14xD
B1
20xD
A4
24xD
A3
28xD
A2
34xD
A1
38xD
20
21
22
23
24
31
32
33
34
35
36
37
38
39
40
A
B
C
D

EXTRUDER FOR CONTINUOUSLY MANUFACTURING COMPOSITES OF POLYMER AND CELLULOSIC FIBRES

FIELD OF THE INVENTION

The present invention relates to a process for continuously manufacturing composites of polymer and cellulosic fibres and to the compounded material obtained therewith. It also relates to an extruder to be used in this process.

BACKGROUND OF THE INVENTION

It is known to produce fibre reinforced plastics. For instance GB 1,151,964 describes a method for obtaining a plastics material reinforced with brittle fibres such as glass fibres. According to this method a brittle fibre substance is supplied as a continuous strand to the other components of the mixture in such a manner that the fibre breaks to a predetermined length. The apparatus used for this process comprises several mixing and kneading members which are not specified.

Lately, the focus on reinforcing fibres is shifting from glass fibres to certain kinds of cellulosic fibres which have outstanding intrinsic mechanical properties. These have the potential to compete with glass fibres as reinforcing agents in plastics. The specific strength of these agrofibres is 50 to 80 percent of glass fibres, whereas the specific modulus can exceed that of glass fibres. Supplementary benefits include low cost, low density, renewability and (bio)degradability. In addition, they are less abrasive during processing with thermoplastics and do not expose operators to potential safety or health problems.

A major disadvantage of cellulosic fibres is the limited temperature at which they should be processed without losing their additional mechanical properties. Further, it has been proven difficult to obtain a homogeneous mixture of polymer and fibre. This is mainly due to the non-polar polymeric surface versus the highly polar fibre surface which prevents satisfactory fibre/polymer intertwining.

EP 426,619 describes a method of producing panels from a thermoplastic polymer and a thermosensitive filler by means of an extruder having at least three feedingly effective helical extrusion sections and at least two non-feeding kneading sections. The extruder thus comprises at least two kneading zones and at least three extrusion zones. The filler is preferably fed into the second extrusion zone.

When cellulosic fibres are used it is important that during the extrusion process these fibers obtain and maintain a high aspect ratio so as to obtain a compounded material with mechanical properties comparable with those of materials containing glass fibres. This means that the diameter should be as small as possible, preferably so called elementary fibres are used. Further the length of the fibres should be as large as possible.

Obtaining such a high aspect ratio of the fibres in the final product has up to now not been achieved. The problem with extrusion processes according to the state of the art is that the high shear forces in the extruder often result not only in a smaller diameter of the fibres but also in a smaller length of the fibres. This reduces the strength properties of the compounded material considerably, relative to the glass fibre reinforced materials.

Accordingly, a substantial need exists for a continuous process for the production of polymer/cellulosic fibre composites with substantially improved mechanical properties, i.e. its rigidity and its strength. In addition, these resulting property improvements should be valid for multiple fibre sources at broad polymer processing temperature ranges and independent from the polymeric melt behaviour.

SUMMARY OF THE INVENTION

The above objects are achieved by the present invention. The present invention relates to a process for continuously manufacturing composites of polymer and cellulosic fibres, comprising the steps of:

a) feeding a polymer upstream into an extruder;

b) melting and mixing the polymer in a zone (A) of the extruder; wherein zone (A) comprises at least one positive transportation screw element, c) feeding cellulosic fibres into the extruder in a zone (B) of the extruder, which zone (B) is located downstream of zone (A);

d) transporting the mixture of polymer and cellulosic fibres obtaining in zone (B) through a degassing zone (C), which zone (C) is located downstream of zone (B), wherein zone (C) comprises at least one positive transportation screw element and e) transporting the mixture obtained in zone (C) through a pressure building zone (D) of the extruder, which zone (D) is located downstream of zone (C), wherein zone (D) comprises at least one positive transportation screw element, f) releasing the mixture obtained in zone (D) into a die, characterized in that zone (B) comprises at least one positive transportation screw element, at least one kneading section and at least one negative transportation screw element such that in zone (B) of the extruder the cellulosic fibres are fibrillated to obtain cellulosic fibres with an aspect ratio as high as possible, while simultaneously mixing the cellulosic fibres with the melted polymer.

The design of this process is such that during the continuous mixing the cellulosic fibres are opened up to elementary fibres (fibrillation) with a high aspect ratio, which are homogeneously distributed in the polymeric melt. The process results in a compounded material with improved rigidity and strength.

The present invention also relates to an extruder which can be used to carry out the process. The present invention comprises all extruders with two separate feeding ports and a degassing port. The preferred extruder for performing the process of the present invention is a corotating twin-screw extruder. An example of such an extruder is a Berstorff ZE corotating twin-screw extruder with a length to diameter ratio varying from 35 to 40.

As indicated above, the extruder comprises four zones: a zone (A) where a polymer fed to the extruder is melted and mixed; a zone (B) where cellulosic fibres are fed to the extruder, fibrillated to elementary fibres and simultaneously mixed with the polymer; a zone (C) wherein the mixture of polymer and cellulosic fibres obtained in zone (B) is degassed and a zone (D) where pressure is built up.

According to the invention zone (A), which is the polymer melting and mixing zone, comprises at least one positive transportation screw element. Preferably zone (A) further comprises at least one kneading section and at least one negative transportation screw element. Preferably, zone (A) begins at a distance of 20×D calculated from the beginning of the die, wherein D stands for the diameter of the extrusion screw. Generally zone (A) ends at a distance of 38×D.

In this application the location of the zones is calculated from the beginning of the die, i.e. from the end of the extruder. This is contrary to general practice in which these distances are calculated from the beginning of the extruder. This is done because according to the invention it is important that the feeding port for the fibres is located as close as possible to the end of the extruder.

Zone (A) can further be divided into four temperature zones. Zone (A1) defines the feeding of the polymer. In this zone, which is generally located between 34×D and 38×D, the polymeric material is fed to the extruder. A conventional feeder in combination with a hopper are generally used for this purpose. After being fed to the extruder, the material is transported to zone (A2).

In zone (A2), which is generally located between 30×D and 34×D, the polymeric material starts to melt, predominantly by shear forces. From (A2) the material is transported to (A3), which is located between 24×D and 30×D. From this zone the polymer is transported to zone (A4) located between 24×D and 20×D. Both zone (A3) and (A4) serve to further melt and mix the polymer.

Zone (B), which is the fibre fibrillation and mixing zone, comprises at least one positive transportation screw element, at least one kneading section, preferably at least two kneading sections, and at least one negative transportation screw element, Zone (B) is preferably located at a distance between 8×D and 20×D. The at least one kneading section of zone (B) is preferably located at a distance between 10×D and 13×D.

Zone (B) comprises two temperature zones (B1) and (B2). In zone (B1) the predried cellulosic fibres are continuously and gravimetrically fed in a conventional manner, for instance from a feeder to a hopper and further to the extruder. The position of this zone is between 14×D and 20×D. Preferably the fibres are fed at 16×D. The amount of fibres fed is such that the weight ratio of the fibres in the final compounded material is control led to a certain value. In addition the fibres start to be distributed in this zone.

In zone (B2) the fibres are fibrillated to elementary fibres. In addition the fibres are distributed homogeneously through the polymer matrix. If more than one positive transportation screw element is present in zone (B2), these elements preferably have a decreasing pitch in the flow direction of the polymer and fibre mixture. This zone is located between 8×D and 14×D.

Zone (C), the degassing zone, comprises at least one positive transportation screw element. In this zone water and other thermally unstable components are removed from the compounded mixture. For this purpose a conventional degassing port is present which is connected to a vacuum pump. At the end of this zone when the volatile substances have substantially been removed, binding of the fibres and matrix begins.

Zone (D) the pressure building zone, comprises at least one positive transportation screw element. Preferably this zone comprises at least two positive transportation elements. In that case these elements have a decreasing pitch in the direction of the die. This results in an increase in pressure necessary to press the compounded material through the die.

In this zone further homogeneous distribution of the fibres into the matrix and compaction of the compounded material is accomplished resulting in the penetration of polymeric material into the surface pores and microcracks of the cellulosic fibres. During this process both mechanical interlocking and chemical coupling of matrix and fibres are further increased resulting in optimised fibre/matrix interaction. Zone (D) comprises one temperature zone.

The temperatures of the different temperature zones described above depend upon the kind of polymer used. If the polymer is polyethylene, polypropylene or polystyrene, the following temperature profile may be applied.

| Zone | Temperature (° C.) |
|---|---|
| A1 | 25 to 160 |
| A2 | 165 to 185 |
| A3 | 190 to 210 |
| A4 | 190 to 210 |
| B1 | 185 to 205 |
| B2 | 180 to 200 |
| C | 180 to 200 |
| D | 185 to 205 |

The thermoplastic polymers that can be applied in the invention comprise "commodity" plastics like low density polyethylene, high density polyethylene, poly(ethylene-copropylene), polypropylene (homopolymer and copolymer) and polystyrene (homopolymer, copolymer and terpolymers). In addition engineering plastics can be applied. Besides the virgin polymeric material, the recycled grades of the above-mentioned plastics are also applicable in the present invention.

A general definition of cellulosic fibres for the purpose of the present invention is 'any fibres where the main constituents are of plant tissue and whose main component consist of α-cellulose'. Preferably annual plant fibres or bast fibres, like flax, hemp, jute and kenaf are used. According to a different embodiment paper fibres such as recycled fibres from newspaper are used. It is also possible to use a combination of different types of fibres such as paper fibres and bast fibres. Annual growth plant fibres can, by means of their intrinsic mechanical properties, generally compete with glass fibres.

Generally the raw cellulosic fibre bundles are between one and five millimeters in diameter. After being fibrillated during the compounding process, the cellulosic fibre diameter generally varies from ten to hundred micrometers, whereas the fibre aspect ratio varies from 7 to 100.

The present process is especially suitable for a feed consisting of raw cellulosic fibres which is very economical, However, it is also possible to feed elementary fibres to the extruder. The present process is then advantageous because the elementary cellulosic fibres retain their high aspect ratio.

The amount of fibres fed to the extruders is such that in the final compounded material the fibre content is 5 wt. % to 50 wt. % based on the weight of the compounded material, preferably 30 wt. % to 40 wt. %, most preferably 40 wt. %.

According to the present invention it is preferred to add a coupling agent to the polymeric material. With a coupling agent is meant a polymer which can be mixed with the polymer matrix and which can be chemically coupled onto the fibres. The preferred polymer to coupling agent ratio for a polyolefinic matrix (e.g. polyethylene, polypropylene) is 70 to 6, with a most preferred ratio of 9 to 16, based on weight. For the polystyrene matrix the preferred polymer to coupling agent ratio is 700 to 60, 450 to 550 being most preferred.

The preferred coupling agent for polyethylene is maleic anhydride grafted polyethylene copolymer. The preferred coupling agent for polypropylene is maleic anhydride grafted polypropylene copolymer. The preferred coupling agent for polystyrene is maleic anhydride grated polystyrene copolymer.

The coupling agent is preferably dry mixed with the polymer before being introduced into the extruder. For this purpose any conventional blender may be used. The mixture thus obtained is fed to the feeder as mentioned above. The polymer and coupling agent are homogeneously mixed in zone (A) of the extruder.

Other additives which can be added to the polymer comprise conventional additives such as pigments, antioxidants, fillers and flame retardants. Examples of fillers that may be used are talc, calcium carbonate and carbon black.

The mechanical properties of the compounded material according to the present invention compared with the properties of the polymer matrix are shown below.

| Material | Stiffness [GPa] | Strength [MPa] |
|---|---|---|
| PP | 1.2 | 41 |
| PP/cellulose fibre | 5.8 | 95 |
| LDPE | 0.1 | 6 |
| LDPE/cellulose fibre | 1.6 | 28 |
| HDPE | 0.9 | 20 |
| HDPE/cellulose fibre | 3.5 | 47 |
| PS | 1.9 | 40 |
| PS/cellulose fibre | 6.0 | 65 |

PP = polypropylene
LDPE = low density polyethylene
HDPE = high density polyethylene
PS = polystyrene
% cellulose fibre = 40% by weight The compounded material exiting the die may be granulated before being further processed. These granules can be formed into articles by means of thermoforming processing techniques such as injection molding and compression molding. It is also possible to directly mould the compounded material obtained into sheets, tubes, profiles, etc. The articles obtained from the compounded material may serve to replace wood, plastic and alternatively filled- or reinforced composite alternatives.

BRIEF DESCRIPTION OF THE DRAWINGS

The invention shall now be described in more detail by means of the annexed drawing which illustrates the invention extruder.

DETAILED DESCRIPTION OF THE INVENTION

According to the present process a polymer is fed to the extruder at feeding port (21), (zone A1). Before feeding, the polymer is preferably mixed with a coupling agent in a blender (not shown), added to a feeder (not shown) and the dry mixture is then gravimetrically fed from the feeder through a hopper (not shown) into the extruder (20).

The polymeric material starts to melt, predominantly by shear forces, as it is transported through zone (A2). In zone (A3) the material is further melted; in addition both polymer and coupling agent are homogeneously mixed, while potential temperature differences have vanished to a large extent. Distributive mixing of the coupling agent in the polymeric matrix is further optimized in zone (A4). The zone (A) comprises at least one positive transportation screw element (31) and preferably further comprises at least one kneady section (32) and at least one negative transportation screw element (33).

In zone (B1) predried cellulosic fibres are continuously and gravimetrically fed at feeding port (22) from a feeder to a hopper (not shown). In this zone the cellulosic fibres are introduced into the polymeric melt. In zone (B2), the fibres are virtually fibrillated to elementary fibres in the kneading section. In addition the fibres start to be distributed in this zone. The zone (B) comprises at least one positive transportation screw element (34), at least one kneading section (35), preferably at least two kneading sections (35, 36) and at least one negative transportation screw element (37).

Following the transporting screw elements with decreasing pitch, resulting in increasing pressure in zone (B2), the fibres are further homogenously distributed in the polymeric matrix. In zone (C) water and other thermally unstable components are removed from the compounded mixture in degassing port (23), to a vacuum pump (not shown). With the volatiles being removed chemical coupling of fibres and matrix preferably starts. The zone (C) comprises at least one positive transportation screw element (38).

In zone (D) homogenous distribution of the fibres into the matrix and compaction of the compounded material is accomplished resulting in the surface pores and microcracks of the cellulosic fibres. During this process both mechanical interlocking and chemical coupling of matrix and fibres are further increased resulting optimized fibre/matrix interaction. The zone (D) comprises at least one positive transportation screw element (39) and preferably at least two positive transportation elements (39, 40). From zone (D) the compounded material is pressed through the die (24).

Since the cellulosic fibres are introduced in to the polymeric melt as late as possible, the fibrillated material is the least affected by friction and heat. As a result the fibre aspect ratio remains as high as possible under the described processing conditions, which leads (in combination with optimised chemical and mechanical fibre/matrix coupling) to substantially improved material stiffness and strength properties.

EXAMPLES

Several screw configurations were used to prepare a mixture of polymer and fibre. The extruder was a Berstorff ZE corotating twin-screw extruder. For each example the extruder compounding conditions were, unless indicated otherwise:

| | | |
|---|---|---|
| screw speed | 200 | rpm |
| melt temperature | 195° C. | |
| matrix material | | polypropylene homopolymer $MFI_{230,2.16}$ = 12 g/10 min. |
| fibre content | 30 | wt. % |
| fibre type | | kenaf (except example 5) |

For all examples the fibre length and the percentage of fibres still present as a bundle of the agrofibres in the matrix material was determined. The fibre dimension is an indication of the rigidity and strength of the final material. In order to determine fibre length the agrofibres were extracted from extruder compounded PP/fibre granules using soxlhet extraction with decaline as the solvent. Agrofibre-length measurements were performed at a Kajaani FS-200 following Tappi T271 pm-91.

Example 1 (Comparative)

For this example a screw configuration according to the following table was used:

| | Screw Type | | | | | | | | |
|---|---|---|---|---|---|---|---|---|---|
| | SW | SW | SW | KB | KB | RSE | SW | SW | SW |
| Amount | 6 | 1 | 1 | 1 | 1 | 1 | 14 | 1 | 3 |
| Length (mm) | 60 | 40 | 30 | 50 | 30 | 20 | 60 | 40 | 30 |
| Transport | + | + | + | + | − | − | + | + | + |
| Pitch (mm) | 60 | 40 | 30 | 100 | 60 | 40 | 60 | 40 | 30 |

In this table SW stands for Self Wiping, KB stands for Kneading Block and RSE stands for Reverse Screw Element.

The fibre lengths could not be measured due to a stagnating extruder. This was caused by large numbers of unopened fibre bundles, which constipated the extruder die.

Example 2 ("Heavy" Fibre Mixing and Opening)

For this example a screw configuration according to the following table was used:

| | Screw Type | | | | | | | | | | | | | | | | | | |
|---|---|---|---|---|---|---|---|---|---|---|---|---|---|---|---|---|---|---|---|
| | SW | SW | SW | KB | KB | RSE | SW | KB | KB | KB | RSE | SW | SW | SW | KB | KB | RSE | SW | SW |
| Amount | 6 | 1 | 1 | 1 | 1 | 1 | 7 | 1 | 1 | 1 | 1 | 3 | 1 | 1 | 1 | 1 | 1 | 1 | 3 |
| Length (mm) | 60 | 40 | 30 | 50 | 30 | 20 | 60 | 30 | 30 | 30 | 20 | 60 | 30 | 20 | 30 | 30 | 20 | 40 | 30 |
| Transport | + | + | + | + | − | − | + | + | + | − | − | + | + | + | + | − | − | + | + |
| Pitch (mm) | 60 | 40 | 30 | 100 | 60 | 40 | 60 | 60 | 60 | 60 | 40 | 60 | 20 | 20 | 60 | 60 | 40 | 40 | 30 |

The results of this example are indicated in Table 1.

Example 3 (Optimal Fibre Mixing and Opening)

For this example a screw configuration according to the following table was used.

| | Screw Type | | | | | | | | | | | | | | | | |
|---|---|---|---|---|---|---|---|---|---|---|---|---|---|---|---|---|---|
| | SW | SW | SW | KB | KB | RSE | SW | KB | KB | RSE | SW | SW | SW | KB | SW | SW | SW |
| Amount | 6 | 1 | 1 | 1 | 1 | 1 | 7 | 1 | 1 | 1 | 1 | 1 | 1 | 1 | 3 | 1 | 3 |
| Length (mm) | 60 | 40 | 30 | 50 | 30 | 20 | 60 | 30 | 30 | 20 | 60 | 40 | 30 | 30 | 60 | 40 | 30 |
| Transport | + | + | + | + | − | − | + | + | − | − | + | + | + | + | + | + | + |
| Pitch (mm) | 60 | 40 | 30 | 100 | 60 | 40 | 60 | 60 | 60 | 40 | 60 | 40 | 30 | 60 | 60 | 40 | 30 |

The results of this example are indicated in Table 1.

Example 4 (Batch Kneader)

The compound preparation was performed by batch kneading on a HAAKE Rheomix 3000 equiped with roller rotors. The Rheomix was operated at 185° C. and 100 RPM. The PP granulate was added first and kneaded for 2 minutes, followed by the introduction of the kenaf fibres. This which was kneaded for 7 minutes, after which a composite material with homogeneously dispersed fibres was produced.

Example 5

Example 3 was repeated with the exception that flax fibres were used instead of kenaf fibres. The results are indicated in Table 1.

TABLE 1

| Example | Arithmic average [mm] | Length weighted average [mm] | number of bundled fibres [%] |
|---|---|---|---|
| 1 | — | — | innumerable |
| 2 | 1.17 | 1.63 | 19 |
| 3 | 1.51 | 1.93 | 22 |
| 4 | 0.28 | 0.44 | 1 |
| 5 | 0.63 | 1.43 | not measured |

What is claimed is:

1. Process for continuously manufacturing composites of polymer and cellulosic fibres, consisting essentially of the steps of:

a) feeding a polymer upstream into an extruder;

b) melting and mixing the polymer in a zone A of the extruder; wherein zone A comprises at least one positive transportation screw element;

c) feeding cellulosic fibres into the extruder in a zone B of the extruder, which zone B is located downstream of zone A;

d) transporting the mixture of polymer and cellulosic fibres obtained in zone B through a degassing zone C, which zone C is located downstream of zone B, wherein zone C comprises at least one positive transportation screw element;

e) transporting the mixture obtained in zone C through a pressure building zone D of the extruder, which zone D is located downstream of zone C, wherein zone D comprises at least one positive transportation screw element; and f) pressing the mixture obtained in zone D into a die;

wherein zone B comprises at least one positive transportation screw element, at least one kneading section and at least one negative transportation screw element such that in zone B of the extruder the cellulosic fibres are fibrillated to obtain cellulosic fibres with an aspect ratio as high as possible, while simultaneously mixing the cellulosic fibres with the melted polymer.

2. Process according to claim 1, wherein zone A further comprises a kneading section and at least one negative transportation screw element.

3. Process according to claim 1, wherein zone B comprises at least two kneading sections.

4. Process according to claim 1, wherein zone D comprises at least two positive transportation screw elements with decreasing pitch towards the die.

5. Process according to claim 1, wherein the cellulosic fibres are at least one of bast fibres and paper fibres.

6. Process according to claim 1, further comprising mixing a coupling agent with the polymer before feeding the polymer to the extruder.

7. Process according to claim 1, wherein the fibres are gravimetrically fed in such an amount as to obtain a final compounded material containing 5 to 50 wt. % fibres on the basis of the weight of the compounded material.

8. Process according to claim 7, wherein the fibres are gravimetrically fed in such an amount as to obtain a final compounded material containing 30 to 40 wt. % fibres on the basis of the weight of the compounded material.

9. Process according to claim 1 wherein the extruder is a corotating twin-screw extruder.

10. Compounded material obtainable by the process according to claim 1.

11. Extruder for continuously manufacturing composites of polymer and cellulosic fibres connected to means for feeding a polymer, means for feeding cellulosic fibres and means for degassing the extruder, consisting essentially of:

a zone A where a polymer fed to the extruder is melted and mixed, comprising at least one positive transportation screw element;

a zone B where cellulosic fibres are fed to the extruder, fibrillated and simultaneously mixed with the polymer, comprising at least one positive transportation screw element, at least one kneading section and at least one negative transportation screw element;

a zone C where the mixture of polymer and cellulosic fibres obtained in zone B is degassed, comprising at least one positive transportation screw element;

a zone D where pressure is built up, comprising at least one positive transportation screw element and a die.

12. Extruder according to claim 11, wherein zone A further comprises a kneading section and at least one negative transportation screw element, zone B comprises at least two kneading sections and zone D comprises at least two positive transportation screw elements with decreasing pitch towards the die.

13. Extruder according to claim 11, which is a corotating twin-screw extruder.

14. Extruder according to claim 11, wherein zone B is located at a distance between 8×D and 20×D calculated from the beginning of the die, D being the diameter of the screw.

15. Extruder according to claim 11, wherein the fibres are fed into the extruder at a distance between 14×D and 20×D calculated from the beginning of the die, D being the diameter of the screw.

16. Extruder according to claim 15, wherein the fibres are fed into the extruder at a distance 16×D calculated from the beginning of the die, D being the diameter of the screw.

17. Extruder according to claim 11, wherein the at least one kneading section of zone B is located at a distance between 10×D and 13×D, calculated from the beginning of the die, D being the diameter of the screw.

18. Extruder according to claim 11, wherein zone C is located at a distance between 4×D and 8×D calculated from the beginning of the die, D being the diameter of the screw.

19. Extruder according to claim 11, wherein zone D is located at a distance between 0×D and 4×D calculated from the beginning of the die, D being the diameter of the screw.

* * * * *